US010092132B1

(12) United States Patent
Ryan

(10) Patent No.: US 10,092,132 B1
(45) Date of Patent: Oct. 9, 2018

(54) SYSTEM AND METHOD FOR COLD STORAGE AND HOT OR COLD DELIVERY OF A BREWED BEVERAGE

(71) Applicant: RYAN BROTHERS COFFEE OF SAN DIEGO, INC., San Diego, CA (US)

(72) Inventor: Harry Ryan, San Diego, CA (US)

(73) Assignee: RYAN BROTHERS COFFEE OF SAN DIEGO, INC., San Diego, CA (US)

( * ) Notice: Subject to any disclaimer, the term of this patent is extended or adjusted under 35 U.S.C. 154(b) by 0 days.

(21) Appl. No.: 15/697,229

(22) Filed: Sep. 6, 2017

(51) Int. Cl.
*A47J 31/46* (2006.01)
*A23F 3/16* (2006.01)
*A23F 5/24* (2006.01)
*A47J 41/00* (2006.01)

(52) U.S. Cl.
CPC ............ *A47J 31/46* (2013.01); *A23F 3/16* (2013.01); *A23F 5/24* (2013.01); *A47J 41/00* (2013.01)

(58) Field of Classification Search
CPC ... A47J 31/46; A47J 41/00; A23F 3/16; A23F 5/24
See application file for complete search history.

(56) References Cited

U.S. PATENT DOCUMENTS

| | | | | |
|---|---|---|---|---|
| 2,077,564 A | * | 4/1937 | Heuser | A23F 5/243 426/316 |
| 2,767,960 A | * | 10/1956 | Fast | F25D 31/002 165/201 |
| 2,784,879 A | * | 3/1957 | Fischer | A47J 31/54 165/101 |
| 2,912,142 A | * | 11/1959 | Schultz | B67D 3/0009 222/129 |
| 3,221,806 A | * | 12/1965 | Birmingham | F25D 31/002 165/64 |

(Continued)

FOREIGN PATENT DOCUMENTS

| | | | |
|---|---|---|---|
| DE | 10344328 | * | 4/2005 |
| JP | 2015006916 | * | 1/2015 |

OTHER PUBLICATIONS

Abstract/Figure for CN204931369 published Jan. 2016.*
(Continued)

*Primary Examiner* — Anthony J Weier
(74) *Attorney, Agent, or Firm* — Arc IP Law, PC; Joseph J. Mayo

(57) ABSTRACT

A delivery system and method for a brewed beverage, such as coffee or tea, that stores a batch of brewed beverage in a cooled container, and heats a serving quantity on demand at the point of dispensing. A heater such as a tankless water heater may be connected to a dispensing line to generate hot servings on demand. Cold servings may also be provided. Quality control of the brewing process may be improved by brewing in a centralized, controlled environment and then shipping cooled containers to dispensing points such as coffee shops or cafés. Containers may be filled with a gas such as nitrogen to prevent oxidation, thereby preserving freshness during storage or shipping. At the dispensing site, containers may be refrigerated and attached to gas tanks to maintain the freshness as servings are dispensed.

19 Claims, 5 Drawing Sheets

(56) References Cited

U.S. PATENT DOCUMENTS

| | | | | |
|---|---|---|---|---|
| 3,688,950 | A * | 9/1972 | Parish | B67D 3/00 222/146.1 |
| 4,940,164 | A * | 7/1990 | Hancock | B01F 3/04241 222/146.6 |
| 5,172,832 | A * | 12/1992 | Rodriquez, Jr. | B67D 3/00 141/314 |
| 5,493,873 | A * | 2/1996 | Donselman | B67D 3/00 222/146.1 |
| 5,623,990 | A * | 4/1997 | Pirkle | F24D 1/005 165/294 |
| 5,848,222 | A * | 12/1998 | Jung | F24H 1/18 222/146.5 |
| 6,679,400 | B1 * | 1/2004 | Goodman | B67D 1/16 137/312 |
| 7,905,374 | B2 * | 3/2011 | Yui | A61L 2/04 222/146.1 |
| 8,857,669 | B2 * | 10/2014 | Algora | B67D 3/0009 222/146.1 |
| 8,875,944 | B2 * | 11/2014 | Shiotani | B67D 3/0009 141/352 |
| 9,254,060 | B2 * | 2/2016 | Butera | A47J 31/46 |
| 9,790,079 | B2 * | 10/2017 | Groesbeck | B67D 3/0035 |
| 2002/0130137 | A1 * | 9/2002 | Greenwald | A47J 31/467 222/54 |
| 2006/0086137 | A1 * | 4/2006 | Brand | B67D 3/0009 62/389 |
| 2006/0144865 | A1 * | 7/2006 | Yoshida | A47J 41/0033 222/209 |
| 2009/0107342 | A1 * | 4/2009 | Piscaer | A47J 31/401 99/323.1 |
| 2016/0083242 | A1 * | 3/2016 | Groesbeck | B67D 3/0009 222/146.2 |
| 2016/0207751 | A1 * | 7/2016 | Groesbeck | B67D 3/0009 |
| 2017/0290354 | A1 * | 10/2017 | Pabst | A23F 5/26 |

OTHER PUBLICATIONS

Carr. Patents Handbook—A Guide for Inventors and Researchers to Searching Patent Documents and Preparing and Making an Application. 1995. p. 54.*

* cited by examiner

SYSTEM AND METHOD FOR COLD STORAGE AND HOT OR COLD DELIVERY OF A BREWED BEVERAGE

BACKGROUND OF THE INVENTION

Field of the Invention

One or more embodiments of the invention are related to the field of dispensing methods and systems for beverages. More particularly, but not by way of limitation, one or more embodiments of the invention enable a system and method for distributing brewed beverages, such as coffee and tea, by storing a beverage at a cold temperature for freshness, and optionally heating a single serving portion of the beverage at the point of dispensing.

Description of the Related Art

Brewed beverages such as coffee and tea are typically brewed and served at a hot temperature. These beverages rapidly lose their freshness after they are brewed. As a result, these beverages are often brewed at the point of dispensing, for example in a coffee shop, and served shortly thereafter. While this approach may improve product freshness, it has other drawbacks. It may be wasteful, since a brewed quantity that is not served quickly after brewing may be discarded in favor of a new brewed batch. It also introduces quality control issues, since the brewing process may be difficult to control at the point of delivery.

The freshness of brewed beverages may be maintained longer if the brewed product is stored at a cold temperature. Freshness may be further enhanced by storing the brewed beverage in a sealed container with a gas such as nitrogen, which may prevent oxidation. Storing a brewed beverage in a cold container also permits centralization of the brewing process (rather than requiring brewing at the point of delivery), which may improve quality control. These techniques are used for example with cold brewed products such as beer. However, they have not been applied to hot brewed beverages such as coffee and tea, since consumers typically desire to have these beverages served hot. There are no known methods or systems that combine the benefits of centralized brewing and cold storage with delivery of a hot serving.

For at least the limitations described above there is a need for a system and method for cold storage and hot or cold delivery of a brewed beverage.

BRIEF SUMMARY OF THE INVENTION

One or more embodiments described in the specification are related to a system and method for cold storage and hot or cold delivery of a brewed beverage. Embodiments may allow the brewing process to occur at a different time and place from the dispensing of a beverage to a consumer. Servings may be heated on demand at the point of dispensing, while a brewed batch may be maintained in a cold storage environment (for example in a keg inside a refrigerator) to maintain freshness.

In one or more embodiments, a freshly brewed beverage (such as for example, without limitation, coffee or tea) may be placed into a container such as a keg, and the container may be stored cold to maintain freshness. A gas such as nitrogen may be added to the keg to displace oxygen, thereby reducing or eliminating oxidation. A container may be delivered to a dispensing point (such as a coffee shop). At the dispensing point, the container may be maintained in a cold environment (for example in a refrigerator similar to a "kegerator"). Servings of the beverage may be dispensed either cold or heated, with on-demand heating of a single portion.

Benefits of this method of storing and delivering brewed beverage include maintaining product freshness, and eliminating brewing quality control problems that can occur when brewing is done at the point of dispensing. Consistency of the product is maintained, and product may be heated (or served cold) on-demand at any desired temperature. Brewing high-quality product requires rigorous attention to details such as grind size, cleaning of machinery and containers, quality of water, and precise temperature during brewing. These factors are more easily controlled in a centralized brewing location. Fresh, precisely brewed beverages may be created in this location and then shipped in cold containers (possibly with nitrogen or another gas) to the dispensing point for hot or cold dispensing.

One or more embodiments of the invention enable a method of cold storage of a brewed beverage, and of dispensing a serving quantity of this beverage either hot or cold. A container containing a batch quantity of the brewed beverage may be cooled for storage, for example to maintain product freshness. To dispense servings, the container may be obtained and attached to a dispensing line. An input indicating a desired serving temperature (such as for example hot or cold) may be obtained, and may be used to control the dispensing temperature. If the input indicates that a hot serving is desired, a segment of the dispensing line may be warmed to increase the temperature of a serving portion, and the warmed serving may then be dispensed.

In one or more embodiments, a gas may be added to the container to displace some or all of the oxygen that may contact the beverage. This gas may be for example, without limitation, nitrogen, an inert gas, a gas heavier than oxygen, or any combination thereof. Additional gas may be added into the container at the point of dispensing, for example from a tank coupled to the container, when a serving portion is dispensed, in order to maintain pressure in the container and prevent oxidation.

In one or more embodiments, the container may be maintained at a cold storage temperature before and during dispensing. As an example, the container may be a keg, and the keg may be placed into a keg-sized refrigerator (a "kegerator") at the point of dispensing to maintain the cold storage temperature. A dispensing line (and possibly a gas line) may be attached to the keg via access points in the refrigerator.

One or more embodiments may apply the method of the invention to any brewed beverage, including for example, without limitation, to coffee, tea, or any other beverage. In one or more embodiments, the beverage may be brewed at a hot temperature (for example at 160° F. or above) and then cooled when placed into the container for storage. In one or more embodiments, the beverage may be brewed between 160 degrees Fahrenheit and 205 degrees Fahrenheit, or between 140 and 212 degrees Fahrenheit. In other embodiments, the beverage may be brewed in cold water for a predetermined time period, generally but not limited to a period of hours, and this is known as "cold brew".

In one or more embodiments, a serving portion may be dispensed through a restrictor (for example at the end of a dispensing line), in order to create foam or froth in the serving.

One or more embodiments may support dispensing of either hot or cold serving portions. If the input associated with the desired serving temperature indicates hot dispensing, the serving portion may be heated, for example by activating a heating element coupled to the dispensing line; otherwise a cold serving may be dispensed (for example at substantially the same temperature as the cold storage temperature of the container).

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

A system and method for cold storage and hot or cold delivery of a brewed beverage will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
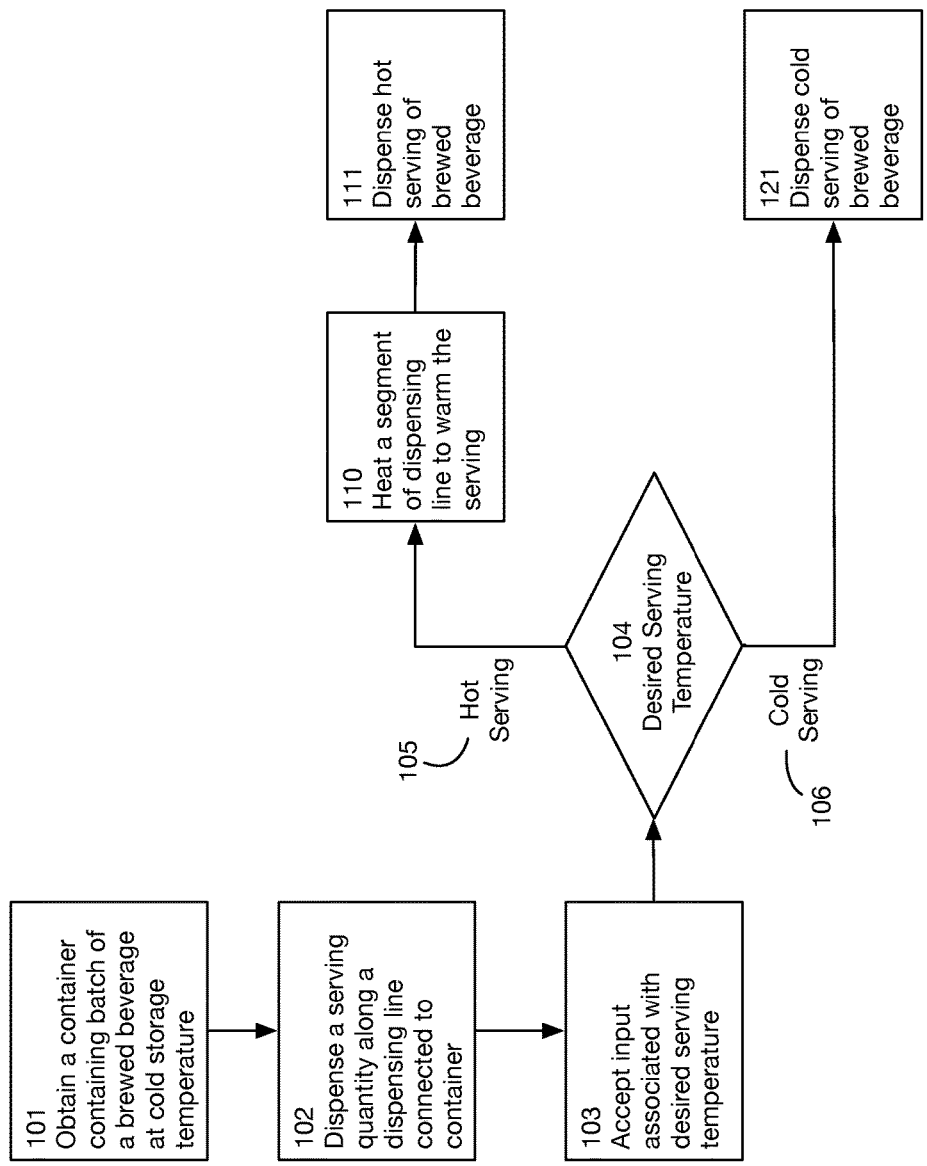
FIG. 1 shows a high-level flowchart of an embodiment of the invention, illustrating a method of dispensing a hot or cold serving from a container that holds a brewed beverage stored at a cold temperature.

FIG. 1 shows an illustrative flowchart of an embodiment of the invention. In step 101, a container containing a batch quantity of a brewed beverage is obtained. The container may be stored at a cold storage temperature, for example to maintain product freshness. One or more embodiments may obtain any type of beverage container, including for example, without limitation, a keg, a barrel, a cask, a case, a box, a bag, a bottle, a can, a canister, a jar, a tub, and a vat. Containers may be of any desired shape and size. Containers may be made of any desired material or materials. For example, without limitation, in one or more embodiments a container may be keg, such as a beer keg or similar keg. One or more embodiments may obtain and use kegs of any size, including for example, without limitation, a mini keg, a pony keg, or a full keg. One or more embodiments may use kegs constructed of steel or aluminum, or any desired material.

The brewed beverage obtained in step 101 may be any brewed beverage, including for example, without limitation, coffee or tea. In one or more embodiments, the batch of brewed beverage may be brewed at a high temperature, (for example at 160° F. or above) and then cooled when placed into the container for storage. In one or more embodiments, the beverage may be brewed between 160 degrees Fahrenheit and 205 degrees Fahrenheit, or between 140 and 212 degrees Fahrenheit. In other embodiments, the beverage may be brewed in cold water for a predetermined time period. The cold storage temperature for the beverage may be selected for example to preserve freshness; one or more embodiments may use any desired cold storage temperature, such as for example a temperature in the range of 32° F. to 40° F. All temperature ranges listed herein may be inclusive in one embodiment and exclusive in another embodiment.

The steps in the flowchart of FIG. 1 after step 101 are related to dispensing of a serving quantity of the brewed beverage. In one or more embodiments, the organization or site that brews the beverage and places it in the container may be different from the organization or site that dispenses serving quantities of the beverage. For example, beverages may be brewed in batches at a central site, and then shipped (potentially refrigerated) to dispensing points. These dispensing points may be for example coffee shops, cafés, or restaurants for the example of coffee distribution. In one or more embodiments, the organization or site that brews the beverage and places it in the container may be the same as the organization or site that dispenses serving quantities of the beverage.

In step 102, a serving quantity of the beverage is dispensed along a dispensing line connected to the container. A connection between a dispensing line and the container may be for example via a keg coupler or similar tap when the container is a keg. The dispensing line may be of any desired size, length, diameter, shape, and material. In one or more embodiments, the dispensing line may consist of multiple segments; each segment may have a different size, length, diameter, shape, or material. The dispensing line may terminate in any desired endpoint such as for example a faucet, tap, or other outlet. Any desired method may be used to select the size of a serving quantity. For example, an operator may open a tap and pour until a desired amount is dispensed, or a machine may be programmed with a selectable set of serving sizes. The beverage may flow into the dispensing line via gravity, pressure, a pump, or any other desired mechanism.

In step 103, an input is accepted that indicates the desired serving temperature for the serving quantity. This input may be categorical (for example, "hot serving" or "cold serving"), or it may indicate a specific desired temperature or temperature range. Any number of serving temperature options may be provided, including only a single option for a hot serving. The input may be obtained in any desired manner, for example by pushing a button or lever, selecting a knob, opening a specific tap or outlet from a number of taps or outlets, or turning or sliding a temperature control. FIG. 1 illustrates an embodiment where the desired serving temperature 104 obtained from the input step 103 is either "hot serving" 105 or "cold serving" 106. In embodiments with other serving temperature options, the flowchart is modified accordingly to provide the desired serving temperature. In the illustrative embodiment of FIG. 1, when "hot serving" option 105 is selected, step 110 heats a segment of the dispensing line in order to warm the serving quantity, and then step 111 dispenses the warmed serving. When "cold serving" option 106 is selected, no warming is performed and step 121 dispenses the cold serving. A cold serving may be dispensed for example at substantially the same temperature as the beverage in the container, such as the cold storage temperature of the container.

Figure 2:
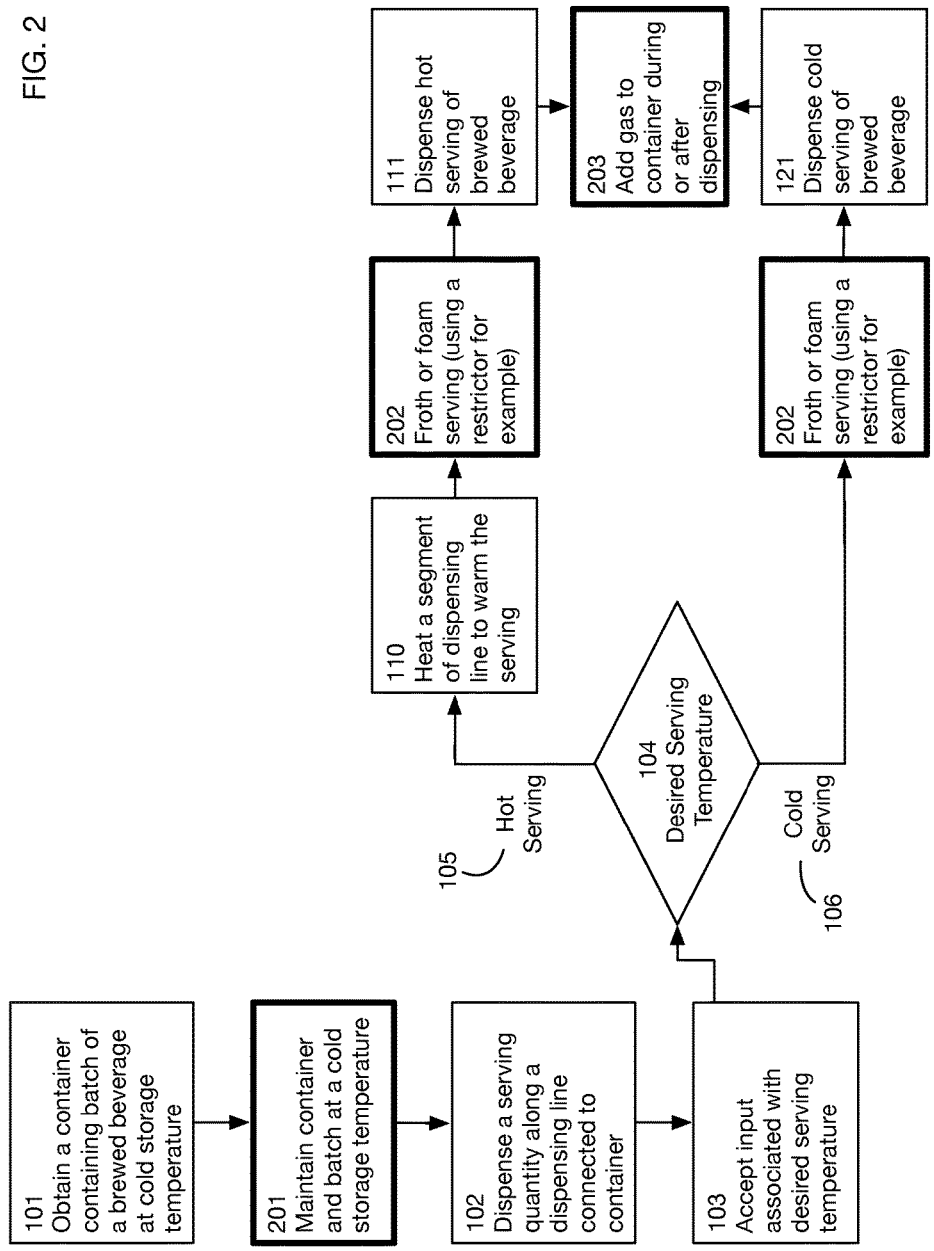
FIG. 2 illustrates a variation on the method of FIG. 1; this variation includes additional steps such as maintaining the container at a cold temperature, frothing the serving when dispensing, and adding gas to the container.

FIG. 2 illustrates variations on the flowchart of FIG. 1, which may be employed in one or more embodiments. In step 201, after obtaining the container, the cold storage temperature of the container (or a different cold storage temperature) is maintained. For example, as an illustration, a coffee shop may obtain (in step 101) a keg of cooled coffee that is delivered on a refrigerated truck. The coffee shop may then in step 201 put the keg into a refrigerator on site, which may for example be connected to the dispensing system. In one or more embodiments step 201 may be performed for example using a "kegerator" refrigerator or a similar cooling system. In step 202, the serving quantity of the beverage (either hot or cold) may be frothed or foamed for serving, for example using a restrictor at the end of the dispensing line. In step 203, gas may be added into the container during or after dispensing a serving. In one or more embodiments, the container obtained in step 101 may be filled with a gas, such as nitrogen, that displaces oxygen; this step may prevent oxidation and preserve freshness during storage. Because dispensing servings from the container may reduce the gas pressure, in one or more embodiments the container may be refilled with gas as (or after) dispensing occurs, in order to maintain the gas pressure and continue to prevent oxidation.

Figure 3:
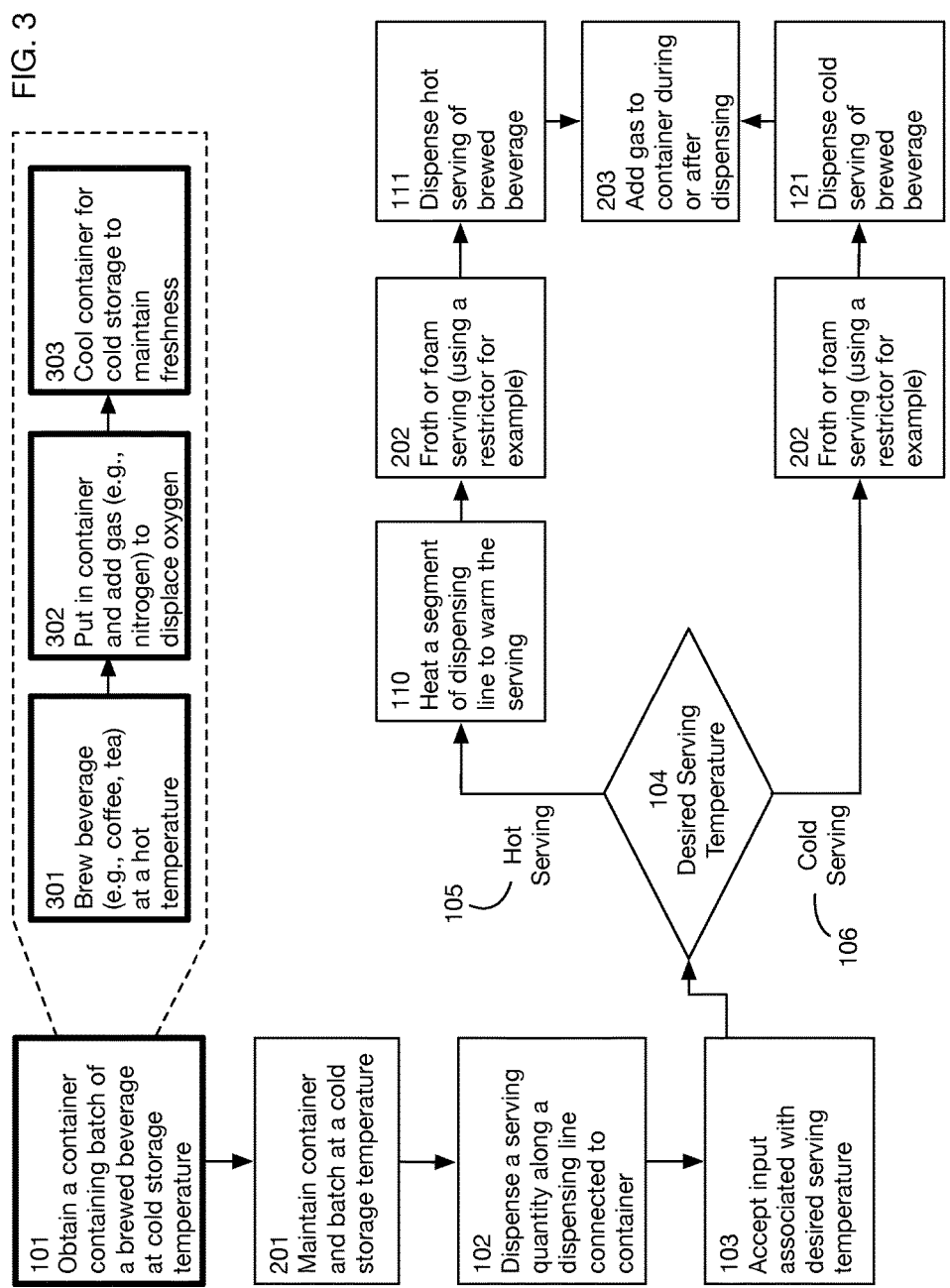
FIG. 3 shows an illustrative process that may be used to brew a beverage and place it in a container for storage.

FIG. 3 shows illustrative steps that may be performed prior to dispensing in order to create the container containing the brewed beverage. As described above, these steps (301 through 303) may be performed by a different organization or at a different site from the dispensing steps, or by the same organization or at the same site. In step 301, a beverage is brewed at a hot temperature. This temperature may be for example, without limitation, 160° F. or above. In step 302, the batch of brewed beverage is added to the container, and a gas is added to displace oxygen. In step 303 the container (and the batch therein) is cooled to a cold storage temperature.

Figure 4:
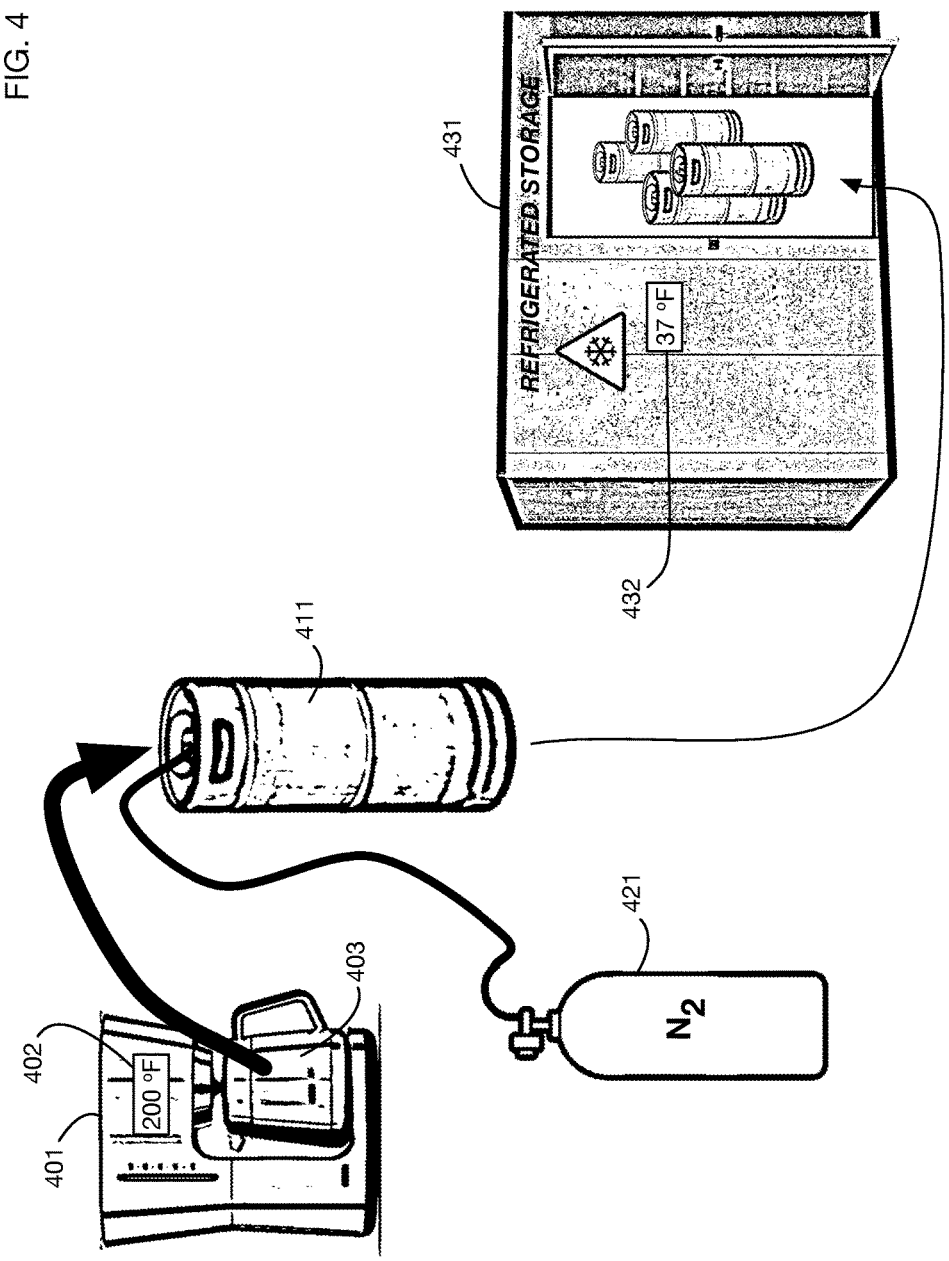
FIG. 4 shows illustrative equipment that may be used for the brewing and storing steps shown in FIG. 3.

FIG. 4 shows illustrative equipment that may be used in one or more embodiments to perform the steps 301, 302, and 303 of FIG. 3. A batch of a beverage such as coffee is brewed in brewing equipment 401, for example at a relatively high temperature 402. The batch 403 is then transferred into container 411, which in this example is a keg. A gas tank 421 is connected to the keg 411 via a gas line, and gas is added into the keg. The gas may be for example, without limitation, nitrogen, argon, CO2, nitrogen/CO2, any inert gas, any gas heavier than oxygen, or any combinations thereof. The keg 411 is then transferred to a cold storage area 431, such as a cold room in a warehouse, which is maintained at cold storage temperature 432. In one or more embodiments, the container 411 may be placed for example directly onto a refrigerated truck for shipment to a dispensing site.

Figure 5:
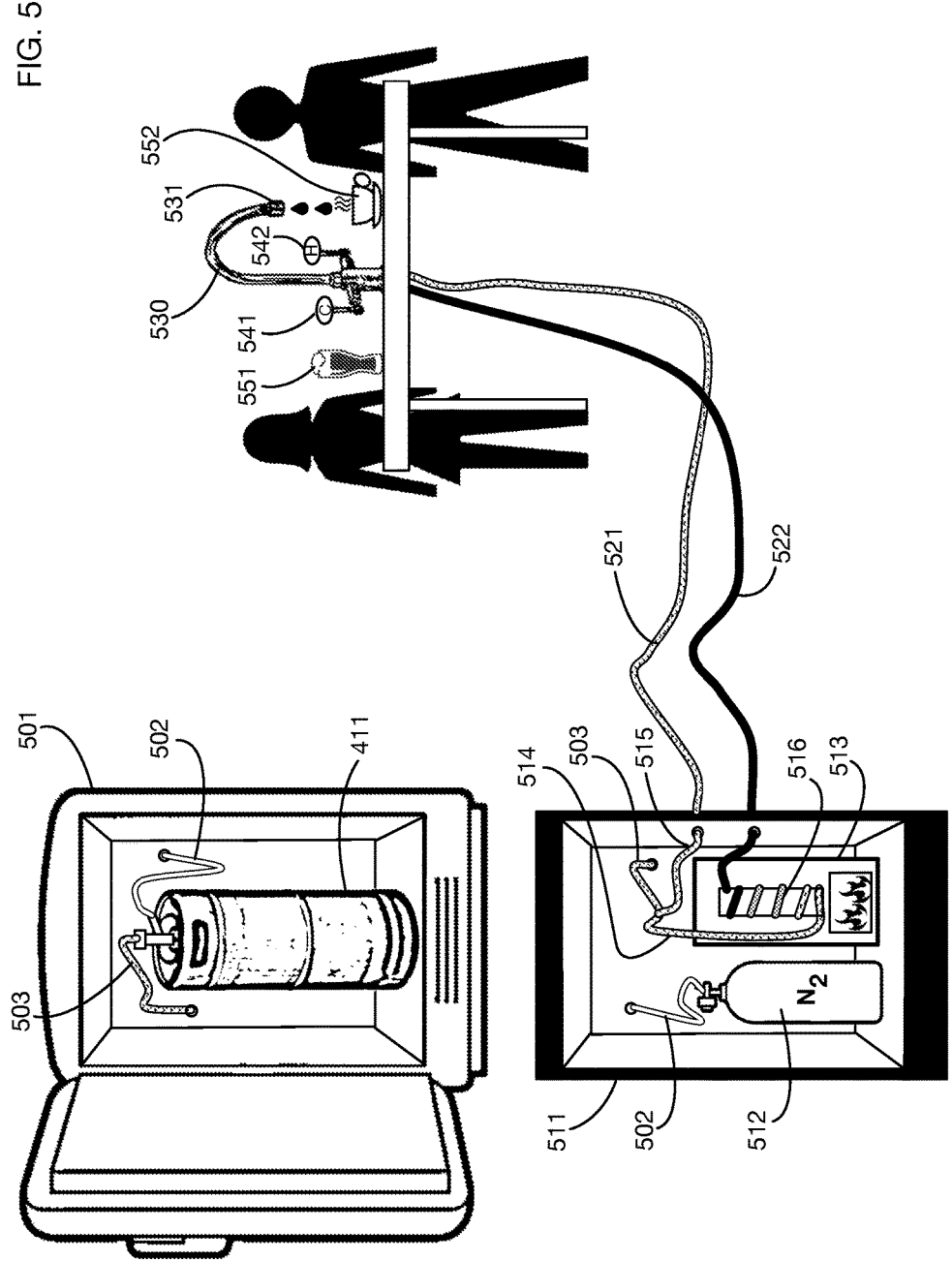
FIG. 5 shows illustrative equipment that may be used for the dispensing process shown in FIGS. 1, 2, and 3.

FIG. 5 shows illustrative equipment that may be used in one or more embodiments to perform the dispensing steps of FIG. 1 through FIG. 3. This equipment may be used at a dispensing site, such as a coffee shop for example. A modified refrigerator 501, similar to a "kegerator", is configured to receive and hold keg 411. This refrigerator 501 (shown from the front with the door open) may be cooled to a desired cold storage temperature. Attached to a coupler on keg 411 are a dispensing line 503 and a gas line 502. These two lines go through the wall of the refrigerator, in this case through the back wall. (One or more embodiments may route dispensing or gas lines in any desired manner, to any point or points and through any walls or joints.)

Image 511 illustrates a back cavity attached to refrigerator 501. (501 is a view from the front, and 511 is a view from the back.) This back cavity contains a gas tank 512 and a heater 513. In one or more embodiments, the gas tank 512 and the heater 513 may be placed in any desired location or locations, not limited to a cavity attached to the refrigerator.

Gas tank 512 supplies gas to gas line 502, which adds gas into keg 411 as or after servings are dispensed. In one or more embodiments, a regulator may be attached to the gas tank 512 or gas line 502. Dispensing line 503 entering the back cavity 511 splits into two lines (for example via a T-joint or similar coupling). Line 515 exits the cavity 511 and continues into cold beverage dispensing line 521. Line 514 flows into heater 513, and into segment 516 that is warmed (for example in a heat exchanger) by heater 513; this hot line then exits as hot dispensing line 522.

Heater 513 may be any heating element that is configured to apply heat to the segment 516 of the dispensing line, thereby warming the serving quantity of the beverage flowing through this segment. For example, without limitation, heater 513 may be a tankless water heater or similar device that provides heat on demand. Heater 513 may be for example electric or gas-powered.

Cold dispensing line 521 and hot dispensing line 522 are then routed to a dispensing tap 530, from which servings are dispensed. This dispensing tap 530 may be of any desired shape, size, material, and configuration. It may be located on or near refrigerator 501, or in a different location such as on a bar or counter. It may be manually operated, automatic, computer controller, or any combination thereof. For the illustrative tap 530, cold and hot levers 541 and 542 provide inputs that select the desired serving temperature. If cold lever 541 is actuated, a cold serving 551 is dispensed from cold dispensing line 521. If hot lever 542 is actuated, a hot serving 552 is dispensed from hot dispensing line 522. In one or more embodiments, a restrictor or similar device may be attached to the end 531 of tap 530, for example to provide frothed or foamed servings.

While the invention herein disclosed has been described by means of specific embodiments and applications thereof, numerous modifications and variations could be made thereto by those skilled in the art without departing from the scope of the invention set forth in the claims.

What is claimed is:

1. A method of cold storage and at least hot delivery of a brewed beverage, consisting essentially of:
    obtaining a container that contains a batch quantity of a brewed beverage, wherein said container containing said batch quantity of said brewed beverage is cooled or has been cooled to a cold storage temperature;
    coupling said container with a dispensing line;
    coupling said dispensing line with a tankless heat exchanger;
    providing a serving quantity comprising a single portion of said brewed beverage from said container along said dispensing line coupled to said container; beating said single portion of said brewed beverage with said tankless heat exchanger coupled with said dispensing line to a predefined serving temperature that is greater than said cold storage temperature,
        wherein said heating occurs on demand at a time of dispensing and at or near a point of dispensing while a remaining brewed batch of said brewed beverage in said container is maintained at said cold storage temperature; and,
    dispensing said single portion of said brewed beverage from a dispenser tap coupled with said tankless heat exchanger.

2. The method of claim 1, wherein said container as obtained further contains a gas added to said container prior to said obtaining, wherein said gas comprises nitrogen that displaces oxygen from the container to reduce or eliminate oxidation.

3. The method of claim 2, further consisting essentially of: placing an additional quantity of said gas into said container when dispensing said single portion or after dispensing said single portion.

4. The method of claim 1, further consisting essentially of:
maintaining said brewed beverage at said cold temperature; and,
maintaining said container at said cold storage temperature.

5. The method of claim 1, wherein said container is a keg and wherein said brewed beverage comprises coffee or tea.

6. The method of claim 1, wherein said brewed beverage is previously brewed at a temperature between 140 degrees Fahrenheit and 212 degrees Fahrenheit.

7. The method of claim 1, wherein said container further contains nitrogen gas, and further consisting essentially of, under pressure from said nitrogen gas, dispensing through a restrictor to create foam or froth.

8. A method of cold storage and at least hot delivery of a brewed beverage, consisting essentially of:
obtaining a container that contains a batch quantity of a brewed beverage, wherein said container containing said batch quantity of said brewed beverage is cooled or has been cooled to a cold storage temperature, wherein said container as obtained further contains a gas added to said container prior to said obtaining, and wherein said gas comprises nitrogen that displaces oxygen from the container to reduce or eliminate oxidation;
maintaining said brewed beverage in said container at said cold storage temperature;
coupling said container to a dispensing line;
coupling said dispensing line with a tankless heat exchanger;
providing a serving quantity comprising a single portion of said brewed beverage from said container along said dispensing line coupled to said container;
accepting an input associated with a desired serving temperature; and,
when said input indicates hot dispensing,
heating said single portion of said brewed beverage via a tankless heat exchanger coupled with said dispensing line to a predefined serving temperature that is greater than said cold storage temperature,
wherein said heating occurs on demand at a time of dispensing and at or near a point of dispensing while a remaining brewed batch of said brewed beverage in said container is maintained at said cold storage temperature; and,
dispensing said single portion of said brewed beverage from a dispenser tap coupled with said tankless heat exchanger.

9. The method of claim 8, further consisting essentially of: placing an additional quantity of said gas into said container when dispensing said single portion or after dispensing said single portion.

10. The method of claim 8, wherein said container is a keg and wherein said brewed beverage comprises coffee or tea.

11. The method of claim 8, wherein said brewed beverage is previously brewed at a temperature between 140 degrees Fahrenheit and 212 degrees Fahrenheit.

12. The method of claim 8, further consisting essentially of, under pressure from said nitrogen gas, dispensing through a restrictor to create foam or froth.

13. A system for cold storage and at least hot delivery of a brewed beverage, consisting essentially of:
a container configured to contain a batch quantity of a brewed beverage wherein said container containing said batch quantity of said brewed beverage is cooled or has been cooled to a cold storage temperature;
a dispensing line coupled to said container and configured to provide a serving quantity comprising a single portion of said brewed beverage from said container along said dispensing line;
a tankless heat exchanger coupled with said dispensing line;
wherein said tankless heat exchanger is configured to heat said single portion of said brewed beverage with said tankless heat exchanger coupled with said dispensing line to a predefined serving temperature that is greater than said cold storage temperature, and
wherein said heat said single portion of said brewed beverage occurs on demand at a time of dispensing and at or near a point of dispensing while a remaining brewed batch of said brewed beverage is maintained at said cold storage temperature; and,
a dispenser configured to dispense said single portion having said increase of said temperature from said dispensing line.

14. The system of claim 13, wherein said container further contains a gas added to said container before said beverage is cooled to said cold storage temperature, wherein said gas comprises nitrogen that displaces oxygen from the container to reduce or eliminate oxidation.

15. The system of claim 14, further consisting essentially of:
means for placing an additional quantity of said gas into said container when dispensing said single portion or after dispensing said single portion.

16. The system of claim 13, wherein said container is a keg and wherein said brewed beverage comprises coffee or tea.

17. The system of claim 13, wherein said container further contains nitrogen gas, and further consisting essentially of a restrictor coupled to said dispensing line and configured to, under pressure from said nitrogen gas, create foam or froth in said serving quantity.

18. The method of claim 1, further consisting essentially of accepting an input associated with a desired serving temperature and dispensing said brewed beverage at said cold storage temperature or at said predefined serving temperature according to said input.

19. The system of claim 13, further consisting essentially of an input associated with a desired serving temperature wherein said input is configured to determine when to dispense said brewed beverage at said cold storage temperature or at said predefined serving temperature according to said input.

* * * * *

UNITED STATES PATENT AND TRADEMARK OFFICE
CERTIFICATE OF CORRECTION

PATENT NO. : 10,092,132 B1
APPLICATION NO. : 15/697229
DATED : October 9, 2018
INVENTOR(S) : Harry Ryan Page 1 of 1

It is certified that error appears in the above-identified patent and that said Letters Patent is hereby corrected as shown below:

In the Claims

Column 6, Line 50, Claim 1, replace "dispensing line coupled to said container; beating said" with --dispensing line coupled to said container; heating said--.

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*